United States Patent
Aono et al.

(10) Patent No.: US 12,548,790 B2
(45) Date of Patent: Feb. 10, 2026

(54) FUEL CELL STACK

(71) Applicant: TOYOTA BOSHOKU KABUSHIKI KAISHA, Aichi-ken (JP)

(72) Inventors: Haruyuki Aono, Aichi-ken (JP); Satoshi Kawabe, Ichinomiya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 477 days.

(21) Appl. No.: 18/122,319

(22) Filed: Mar. 16, 2023

(65) Prior Publication Data
US 2023/0307685 A1    Sep. 28, 2023

(30) Foreign Application Priority Data
Mar. 23, 2022    (JP) ................................. 2022-046940

(51) Int. Cl.
*H01M 8/2483*    (2016.01)
*H01M 8/026*    (2016.01)
*H01M 8/04082*    (2016.01)

(52) U.S. Cl.
CPC ......... *H01M 8/2483* (2016.02); *H01M 8/026* (2013.01); *H01M 8/04201* (2013.01)

(58) Field of Classification Search
CPC .................................................. H01M 8/2483
See application file for complete search history.

(56) References Cited

FOREIGN PATENT DOCUMENTS

| JP | 2007-226991 A | 9/2007 |
|---|---|---|
| JP | 2009-59513 | 3/2009 |

OTHER PUBLICATIONS

Japanese Office Action in counterpart Japanese Application No. 2022-046940, dated Jun. 24, 2025 (and translation thereof).

*Primary Examiner* — Brian R Ohara
(74) *Attorney, Agent, or Firm* — Greenblum & Bernstein, P.L.C.

(57) ABSTRACT

A fuel cell stack includes stacked single cells. Each single cell includes a power generating unit, a first separator, and a second separator. The first separator includes a facing surface that faces the power generating unit. The facing surface includes first groove passages. The first groove passages include first main passages and first auxiliary passages. The second separator includes a facing surface that faces the power generating unit. The facing surface includes second groove passages. The second groove passages include second main passages and second auxiliary passages. Extending portions of at least one of a set of the first auxiliary passages or a set of the second auxiliary passages include a wavy section. The wavy section intersects with one of the extending portions of the other one of the set of the first auxiliary passages and the set of the second auxiliary passages with the power generating unit in between.

2 Claims, 4 Drawing Sheets

FUEL CELL STACK

BACKGROUND

1. Field

The present disclosure relates to a fuel cell stack.

2. Description of Related Art

Japanese Laid-Open Patent Publication No. 2009-59513 discloses a fuel cell stack that includes stacked single cells. Each single cell includes an electrolyte membrane electrode structure (hereinafter, referred to as a power generating unit), a first metal separator, and a second metal separator. The first and second separators hold the power generating unit between them.

A direction orthogonal to the direction in which the single cells are stacked is defined as a first direction. At a first end in the first direction, each single cell includes an oxidant gas inlet hole, to which oxidant gas is supplied, a cooling medium inlet hole, to which cooling medium is supplied, and a fuel gas outlet hole, from which fuel gas is discharged. The oxidant gas inlet hole, the cooling medium inlet hole, and the fuel gas outlet hole are arranged in that order in a second direction, which is orthogonal to both the stacking direction and the first direction.

At a second end in the first direction, each single cell includes a fuel gas inlet hole, to which fuel gas is supplied, a cooling medium outlet hole, from which cooling medium is discharged, and an oxidant gas outlet hole, from which oxidant gas is discharged.

The fuel gas inlet hole, the cooling medium outlet hole, and the oxidant gas outlet hole are arranged in that order in the second direction.

The first metal separator includes oxidant gas passage grooves on a surface that faces the power generating unit. The oxidant gas passage grooves are formed by protrusions and recesses.

The oxidant gas passage grooves include linear passage portions (hereinafter, referred to as first linear portions), which are arranged parallel to each other in the first direction, and linear connecting passage portions (hereinafter, referred to as first connecting portions), which extend from opposite ends of the first linear portions toward the oxidant gas inlet hole and the oxidant gas outlet hole.

The first connecting portions extend obliquely with respect to the first linear portions.

The second metal separator includes fuel gas passage grooves on a surface that faces the power generating unit. The fuel gas passage grooves are formed by protrusions and recesses.

The fuel gas passage grooves include linear passage portions (hereinafter, referred to as second linear portions), which are arranged parallel to each other in the first direction, and linear connecting passage portions (hereinafter, referred to as second connecting portions), which extend from opposite ends of the second linear portions toward the fuel gas inlet hole and the fuel gas outlet hole.

The second connecting portions extend obliquely with respect to the second linear portions.

In such a fuel cell stack, the flow of oxidant gas in the first linear portions and the flow of fuel gas in the second linear portions are opposite to each other with the power generating unit in between. This structure is referred to as a counter flow configuration. In contrast, the flow of oxidant gas in the first connecting portions and the flow of fuel gas in the second connecting portions intersect with each other with the power generating unit in between. This structure is referred to as a cross flow configuration.

In general, the power generation efficiency of a region of the power generating unit that corresponds to a counter flow configuration tends to be higher than the power generation efficiency of a region that corresponds to a cross flow configuration. Therefore, in the fuel cell stack disclosed in the above-described publication, the power generation efficiency of the region of the power generating unit that corresponds to the first connecting portions and the second connecting portions tends to be lower than the power generation efficiency of the region that corresponds to the first linear portions and the second linear portions.

As such, to improve the power generation efficiency of the power generating unit, it is desirable to reduce the area of the portion in which the connecting portions are formed on the surface of each separator that faces the power generating unit, while increasing the area of the portion in which the linear portions are formed.

In this regard, the connecting portions may be provided to extend linearly in the second direction from the opposite sides of the linear portions. However, in such a fuel cell stack, the flow of oxidant gas in the first connecting portions and the flow of fuel gas in the second connecting portions agree with each other with the power generating unit in between. This structure is referred to as a co-flow configuration. In this case, the power generation efficiency of the region of the power generating unit that corresponds to the first connecting portions and the second connecting portions is significantly lower than the power generation efficiency of the region that corresponds to the first linear portions and the second linear portions. Accordingly, there is still room for improvement in terms of the power generation efficiency.

SUMMARY

Accordingly, it is an objective of the present disclosure to provide a fuel cell stack that improves the power generation efficiency of a power generating unit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel cell stack includes stacked single cells. Each single cell includes a power generating unit, a first separator, and a second separator. The first separator and the second separator hold the power generating unit between the first separator and the second separator. Each single cell includes manifolds on an outer side of the power generating unit. The manifolds extend through the single cell in a stacking direction of the single cells and are configured such that a fuel gas or an oxidant gas flow through the manifolds. The manifolds include a fuel gas inlet manifold configured to supply the fuel gas into the single cell, a fuel gas outlet manifold configured to discharge the fuel gas from the single cell, an oxidant gas inlet manifold configured to supply the oxidant gas into the single cell, and an oxidant gas outlet manifold configured to discharge the oxidant gas from the single cell. A first direction is orthogonal to the stacking direction. A second direction is orthogonal to both the stacking direction and the first direction. At a first end in the first direction of each single cell, the fuel gas inlet manifold and the oxidant gas outlet manifold are arranged in that order from a first side in the second direction. At a second end in the first direction of each single cell, the oxidant gas inlet manifold and the fuel gas outlet manifold are arranged in that order from the first side in the second direction. The first separator includes a facing surface that faces the power generating unit. The facing surface of the first separator includes first groove passages through which the fuel gas flows. The first groove passages include first main passages that extend in the first direction and are arranged side by side in the second direction, and first auxiliary passages that are adjacent to the first main passages in the first direction and extend toward at least one of the fuel gas inlet manifold and the fuel gas outlet manifold. The second separator includes a facing surface that faces the power generating unit. The facing surface of the second separator includes second groove passages through which the oxidant gas flows. The second groove passages include second main passages that extend in the first direction and are arranged side by side in the second direction, and second auxiliary passages located on a side of the power generating unit that is opposite to the first auxiliary passages. The first auxiliary passages and the second auxiliary passages each include an extending portion that extends in the second direction. The extending portions of at least one of a set of the first auxiliary passages or a set of the second auxiliary passages include a wavy section that extends in a wavy shape in planar directions of the facing surface. The wavy section intersects with one of the extending portions of the other one of the set of the first auxiliary passages and the set of the second auxiliary passages with the power generating unit in between.

Other features and aspects will be apparent from the following detailed description, the drawings, and the claims.

BRIEF DESCRIPTION OF THE DRAWINGS

FIG. 4 is a plan view illustrating a state in which a flow of fuel gas through a wavy section of a first groove passage and a flow of oxidant gas through an extending portions of a second groove passage intersect with each other with a power generating unit in between.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A fuel cell stack according to one embodiment will now be described with reference to FIGS. 1 to 4.

<Basic Configuration of Fuel Cell Stack>

Figure 1:
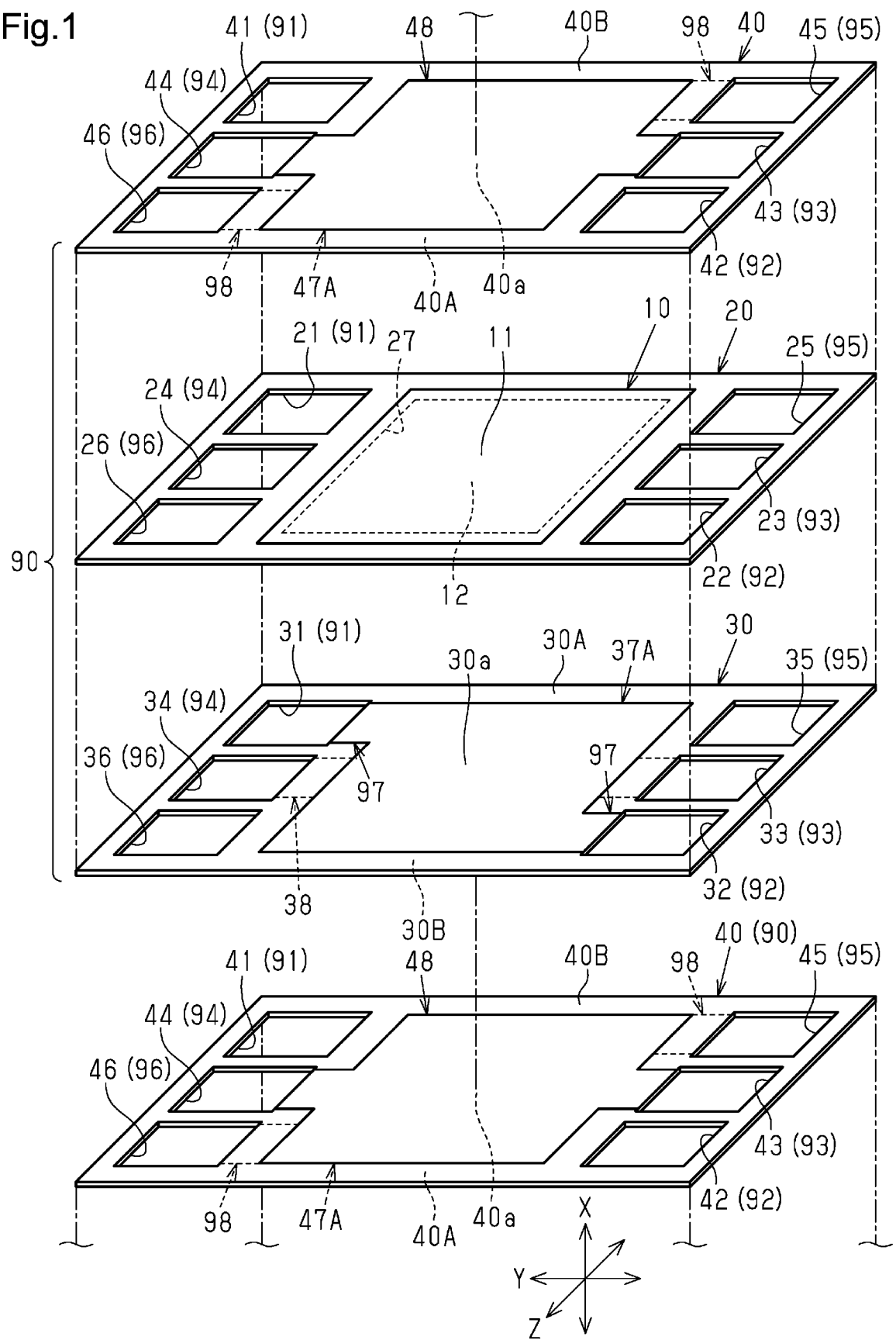
FIG. 1 is an exploded perspective view of a fuel cell stack according to one embodiment.

As shown in FIG. 1, the fuel cell stack includes multiple single cells 90 stacked together. The single cells 90 are rectangular plates. FIG. 1 shows separated components of one of the single cells 90 in the fuel cell stack and a part of an adjacent one of the single cells 90.

In the following description, the stacking direction of the single cells 90 will be simply referred to as a stacking direction X. The longitudinal direction of the single cells 90, which is one of the directions orthogonal to the stacking direction X, will be simply referred to as a longitudinal direction Y. The direction orthogonal to both the stacking direction X and the longitudinal direction Y will be simply referred to as an orthogonal direction Z. The longitudinal direction Y corresponds to a first direction according to the present disclosure. The orthogonal direction Z corresponds to a second direction according to the present disclosure.

Each single cell 90 includes a membrane electrode assembly 10 (hereinafter, referred to as MEA 10), a frame member 20, which holds the MEA 10, a first separator 30, and a second separator 40. The separators 30, 40 hold the MEA 10 and the frame member 20 between them.

The single cell 90 has inlet manifolds 91, 93, 95 for supplying reactant gas or cooling medium into the single cell 90 and outlet manifolds 92, 94, 96 for discharging the reactant gas or the cooling medium in the single cell 90 to the outside.

The inlet manifold 91 and the outlet manifold 92 are manifolds through which fuel gas, which is reactant gas, flows. The fuel gas is, for example, hydrogen gas. The inlet manifold 93 and the outlet manifold 94 are manifolds through which cooling medium flows. The cooling medium is, for example, coolant. The inlet manifold 95 and the outlet manifold 96 are manifolds through which oxidant gas, which is reactant gas, flows. The oxidant gas is, for example, air.

The inlet manifolds 91, 93, 95 and the outlet manifolds 92, 94, 96 each have a rectangular shape in plan view, and extend in the stacking direction X through the single cell 90.

The inlet manifold 91 and the outlet manifolds 94, 96 are located at a first end in the longitudinal direction Y of the single cell 90 (at the left end in the left-right direction in FIG. 1). The inlet manifold 91 and the outlet manifolds 94, 96 are arranged in that order from a first side in the orthogonal direction Z (the back side of the sheet of FIG. 1) toward a second side in the orthogonal direction Z (the front side of the sheet of FIG. 1).

The outlet manifold 92 and the inlet manifolds 93, 95 are located at a second end in the longitudinal direction Y of the single cell 90 (at the right end in the in FIG. 1). The outlet manifold 92 and the inlet manifolds 93, 95 are arranged in that order from the second side in the orthogonal direction Z (the front side of the sheet of FIG. 1) toward the first side in the orthogonal direction Z (the back side of the sheet of FIG. 1).

<MEA 10>

As shown in FIG. 1, the MEA 10 includes a solid polymer electrolyte membrane (not shown; hereinafter referred to as an electrolyte membrane) and electrodes 11, 12 respectively provided on opposite surfaces of the electrolyte membrane. In the present embodiment, the electrode that is joined to a first side in the stacking direction X (the upper side in the up-down direction in FIG. 1) of the electrolyte membrane is a cathode 11. Also, the electrode joined to a second side in the stacking direction X (the lower side in the in FIG. 1) of the electrolyte membrane is an anode 12.

The electrodes 11, 12 each include a catalyst layer joined to the electrolyte membrane and a gas diffusion layer, which is joined to the catalyst layer (neither is shown).

The MEA 10 corresponds to a power generating unit according to the present disclosure.

<Frame Member 20>

As shown in FIG. 1, the frame member 20 has a rectangular shape in plan view and is made of, for example, plastic.

The frame member 20 includes through-holes 21, 22, 23, 24, 25, 26, which are parts of the respective manifolds 91, 92, 93, 94, 95, 96.

The frame member 20 includes an opening 27 in a center. The MEA 10 is joined to the peripheral edge of the opening 27 from the first side in the stacking direction X (upper side as viewed in FIG. 1).

<First Separator 30>

Figure 2:
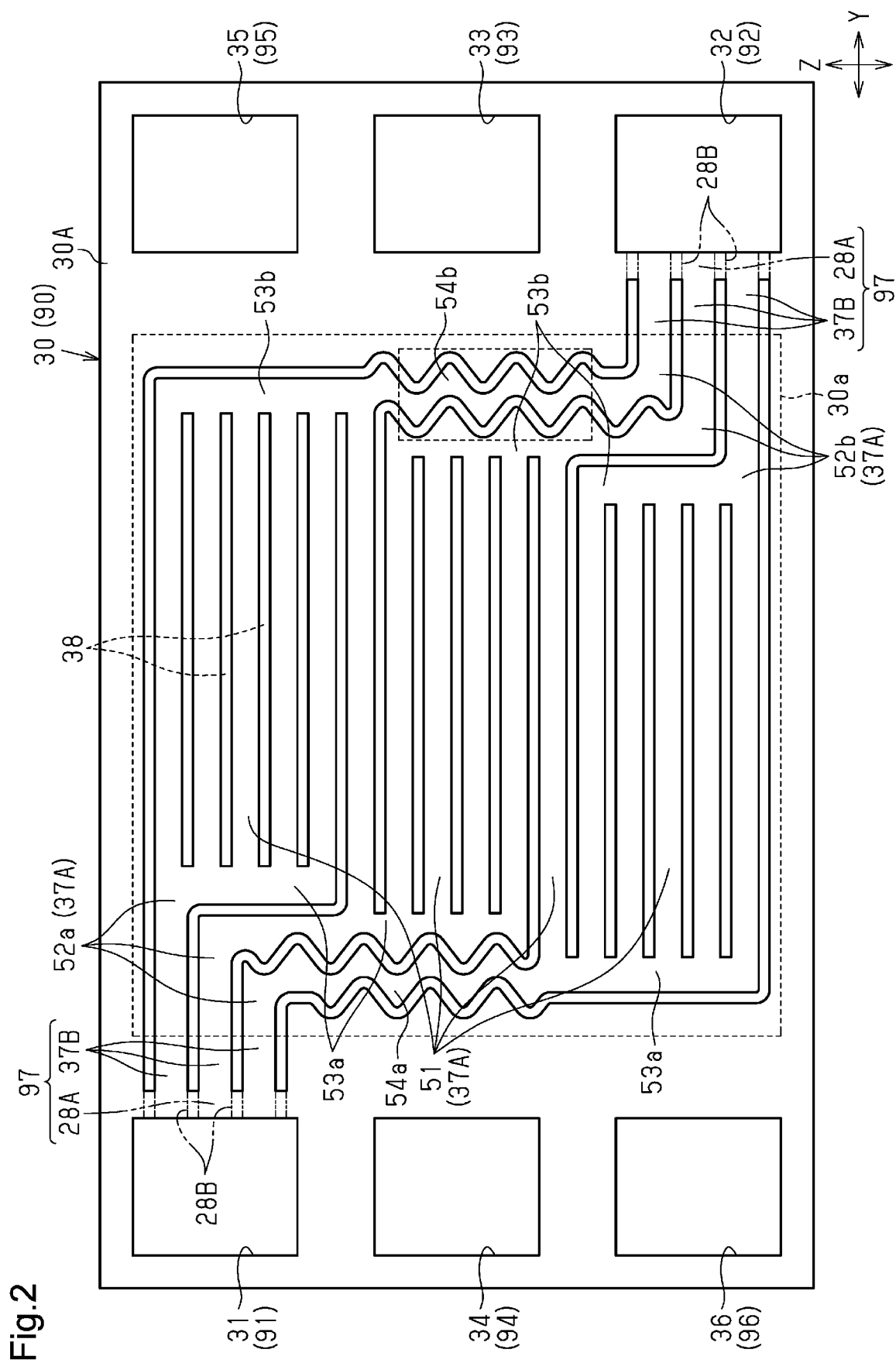
FIG. 2 is a plan view illustrating a first separator of a single cell in the fuel cell stack shown in FIG. 1.

As shown in FIGS. 1 and 2, the first separator 30 is formed by pressing, for example, a metal member that has a rectangular shape in plan view and is made of titanium or stainless steel.

The first separator 30 includes through-holes 31, 32, 33, 34, 35, 36, which are respective parts of the manifolds 91, 92, 93, 94, 95, 96.

The first separator 30 includes a first surface 30A and a second surface 30B, which is on a side opposite to the first surface 30A. The first surface 30A includes a facing surface 30a, which faces the anode 12 of the MEA 10 in the stacking direction X.

The first surface 30A is provided with first groove passages 37A and first connecting passages 37B, through which the fuel gas flows (refer to FIG. 2). The first groove passages 37A and the first connecting passages 37B are formed by shaping the separator 30 to have recesses and protrusions.

The first groove passages 37A are provided in the facing surface 30a. In FIG. 1, the first groove passages 37A are illustrated in a simplified manner.

As shown in FIG. 2, the first groove passages 37A include first main passages 51 and first auxiliary passages 52a, 52b.

The first main passages 51 extend linearly in the longitudinal direction Y and are arranged side by side in the orthogonal direction Z while being spaced apart from each other.

The first auxiliary passages 52a, the number of which is three in the present embodiment, extend toward the inlet manifold 91 from first ends in the longitudinal direction Y (the left ends in the left-right direction in FIG. 2) of the first main passages 51.

Each of the first auxiliary passages 52a is provided with an extending portion 53a extending in the orthogonal direction Z. The extending portions 53a are arranged side by side in the longitudinal direction Y while being spaced apart from each other. The extending portion 53a of each first auxiliary passages 52a is connected to the first ends (left ends in FIG. 2) of some (five or six in the present embodiment) of the first main passages 51.

The extending portions 53a include a wavy section 54a, which extends in a wavy shape in planar directions of the facing surface 30a. In the present embodiment, one of the extending portions 53a that is closest to the first side in the longitudinal direction Y (leftmost one in FIG. 2) includes the wavy section 54a.

The first auxiliary passages 52b, the number of which is three in the present embodiment, extend toward the outlet manifold 92 from second ends in the longitudinal direction Y (the right ends in FIG. 2) of the first main passages 51.

Each of the first auxiliary passages 52b is provided with an extending portion 53b extending in the orthogonal direction Z. The extending portions 53b are arranged side by side in the longitudinal direction Y while being spaced apart from each other. The extending portion 53b of each first auxiliary passages 52b is connected to the second ends (right ends in FIG. 2) of some (five or six in the present embodiment) of the first main passages 51.

The extending portions 53b include a wavy section 54b, which extends in a wavy shape in planar directions of the facing surface 30a. In the present embodiment, one of the extending portions 53b that is closest to the second side in the longitudinal direction Y (rightmost one in FIG. 2) includes the wavy section 54b.

As shown in FIG. 2, the first connecting passages 37B form connecting passages 97. The connecting passages 97 include connecting passages 97 that connect the first auxiliary passages 52a and inlet manifold 91 to each other, and connecting passages 97 that connect the first auxiliary passages 52b and the outlet manifold 92 to each other.

The first connecting passages 37B extend from the first auxiliary passages 52a, 52b toward the outside of the facing surface 30a and are arranged side by side in the orthogonal direction Z while being spaced apart from each other.

Each connecting passage 97 includes a first connecting passage 37B and a remaining portion shown by long-dash double-short-dash lines in FIG. 2. The remaining portion will be referred to as a connecting passage 28A. Each connecting passage 28A is provided between ribs 28B, which protrude from the frame member 20 toward the first surface 30A. In FIG. 1, the connecting passages 28A and the ribs 28B are omitted.

The fuel gas is introduced from the inlet manifold 91 to the first groove passages 37A via the connecting passages 97. Thereafter, the fuel gas flows through the first auxiliary passages 52a, the first main passages 51, and the first auxiliary passages 52b in that order and is discharged to the outlet manifold 92.

As shown in FIG. 1, the second surface 30B is provided with groove passages 38, through which the cooling medium flows. The groove passages 38 connect the inlet manifold 93 and the outlet manifold 94 to each other. The groove passages 38 are formed by shaping the separator 30 to have recesses and protrusions. The shapes of parts of the groove passages 38 conform to the shapes of the recesses and protrusions forming the first groove passages 37A (refer to FIG. 2). In FIG. 1, the groove passages 38 are illustrated in a simplified manner.

<Second Separator 40>

Figure 3:
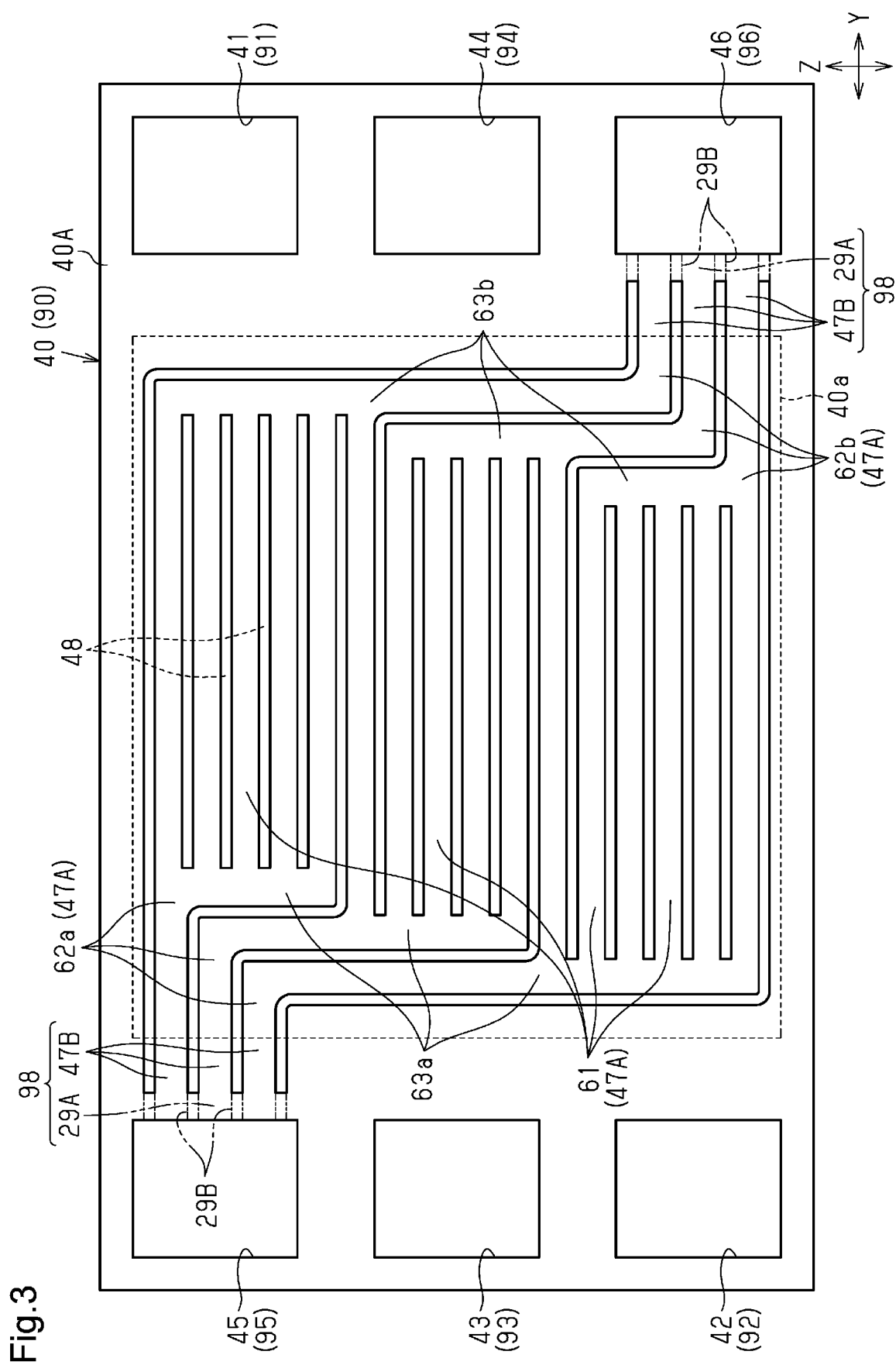
FIG. 3 is a bottom view illustrating a second separator of the single cell in the fuel cell stack shown in FIG. 1.

As shown in FIGS. 1 and 3, the second separator 40 is formed by pressing, for example, a metal member that has a rectangular shape in plan view and is made of titanium or stainless steel.

The second separator 40 includes through-holes 41, 42, 43, 44, 45, 46, which are respective parts of the manifolds 91, 92, 93, 94, 95, 96.

The second separator 40 includes a first surface 40A and a second surface 40B, which is on a side opposite to the first surface 40A. The first surface 40A includes a facing surface 40a, which faces the cathode 11 of the MEA 10 in the stacking direction X.

The first surface 40A is provided with second groove passages 47A and second connecting passages 47B, through which the fuel gas flows (refer to FIG. 3). The second groove passages 47A and the second connecting passages 47B are formed by shaping the separator 40 to have recesses and protrusions.

The second groove passages 47A are provided in the facing surface 40a. In FIG. 1, the second groove passages 47A are illustrated in a simplified manner.

As shown in FIG. 3, the second groove passages 47A include second main passages 61 and second auxiliary passages 62a, 62b.

The second main passages 61 extend linearly in the longitudinal direction Y and are arranged side by side in the orthogonal direction Z while being spaced apart from each other.

The second auxiliary passages 62a, the number of which is three in the present embodiment, extend toward the inlet manifold 95 from second ends in the longitudinal direction Y (the left ends in the left-right direction in FIG. 3) of the second main passages 61.

As shown in FIGS. 2 and 3, the second auxiliary passages 62a are located on a side of the MEA 10 that is opposite to the first auxiliary passages 52b.

As shown in FIG. 3, each of the second auxiliary passages 62a is provided with an extending portion 63a extending linearly in the orthogonal direction Z. The extending portions 63a are arranged side by side in the longitudinal direction Y while being spaced apart from each other. The extending portion 63a of each second auxiliary passages 62a is connected to the second ends (left ends in FIG. 3) of some (five or six in the present embodiment) of the second main passages 61.

Figure 4:
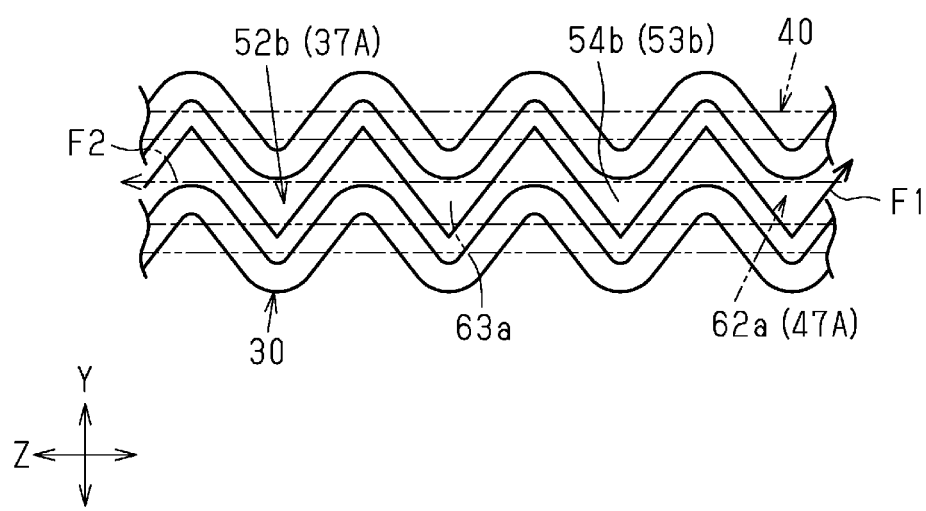

As shown in FIGS. 2 to 4, one of the extending portions 63a that is closest to the second side in the longitudinal direction Y (leftmost one in FIG. 3) is located on a side of the MEA 10 that is opposite to the wavy section 54b. The extending portions 63a and the wavy section 54b intersect with each other multiple times with the MEA 10 in between (see FIG. 4).

As shown in FIG. 3, the second auxiliary passages 62b, the number of which is three in the present embodiment, extend toward the outlet manifold 96 from first ends in the longitudinal direction Y (the right ends in FIG. 3) of the second main passages 61.

As shown in FIGS. 2 and 3, the second auxiliary passages 62b are located on a side of the MEA 10 that is opposite to the first auxiliary passages 52a.

As shown in FIG. 3, each of the second auxiliary passages 62b is provided with an extending portion 63b extending linearly in the orthogonal direction Z. The extending portions 63b are arranged side by side in the longitudinal direction Y while being spaced apart from each other. The extending portion 63b of each second auxiliary passages 62b is connected to the first ends (right ends in FIG. 3) of some (five or six in the present embodiment) of the second main passages 61.

As shown in FIGS. 2 and 3, one of the extending portions 63b that is closest to the first side in the longitudinal direction Y (rightmost one in FIG. 3) is located on a side of the MEA 10 that is opposite to the wavy section 54a. The extending portions 63b and the wavy section 54a intersect with each other multiple times with the MEA 10 in between.

As shown in FIG. 3, the second connecting passages 47B form connecting passages 98. The connecting passages 98 include connecting passages 98 that connect the second auxiliary passages 62a and inlet manifold 95 to each other, and connecting passages 98 that connect the second auxiliary passages 62b and the outlet manifold 96 to each other.

The second connecting passages 47B extend from the second auxiliary passages 62a, 62b toward the outside of the facing surface 40a and are arranged side by side in the orthogonal direction Z while being spaced apart from each other.

Each connecting passage 98 includes a second connecting passage 47B and a remaining portion shown by long-dash double-short-dash lines in FIG. 3. The remaining portion will be referred to as a connecting passage 29A. Each connecting passage 29A is provided between ribs 29B, which protrude from the frame member 20 toward the first surface 40A. In FIG. 1, the connecting passages 29A and the ribs 29B are omitted.

The oxidant gas is introduced from the inlet manifold 95 to the second groove passages 47A via the connecting passages 98. Thereafter, the oxidant gas flows through the second auxiliary passages 62a, the second main passages 61, and the second auxiliary passages 62b in that order and is discharged to the outlet manifold 96.

As shown in FIG. 1, the second surface 40B is provided with groove passages 48, through which the cooling medium flows. The groove passages 48 connect the inlet manifold 93 and the outlet manifold 94 to each other. The groove passages 48 are formed by shaping the separator 40 to have recesses and protrusions. The shapes of parts of the groove passages 48 conform to the shapes of the recesses and protrusions forming the second groove passages 47A (refer to FIG. 3). In FIG. 1, the groove passages 48 are illustrated in a simplified manner.

Operation of the present embodiment will now be described.

As shown in FIG. 4, a flow F1 of fuel gas in the wavy section 54b of the first auxiliary passage 52b and a flow F2 of oxidant gas in the extending portion 63a of the corresponding second auxiliary passage 62a intersect with each other with the MEA 10 in between. This structure is referred to as a cross flow configuration. Therefore, the power generation efficiency of the region in the MEA 10 that corresponds to the first auxiliary passage 52b and the second auxiliary passage 62a is improved as compared with a case in which the extending portions 53b and 63a of both the first auxiliary passage 52b and the second auxiliary passage 62a extend linearly in the orthogonal direction Z. Although not illustrated, the flow F1 of the fuel gas in the wavy section 54a of the first auxiliary passage 52a and the flow F2 of the oxidant gas in the extending portion 63b of the corresponding second auxiliary passage 62b have a cross flow configuration. Therefore, the power generation efficiency of the region in the MEA 10 that corresponds to the first auxiliary passage 52a and the second auxiliary passage 62b is improved as compared with a case in which the extending portions 53a and 63b of both the first auxiliary passage 52a and the second auxiliary passage 62b extend linearly in the orthogonal direction Z.

The present embodiment has the following advantages.

(1) The first groove passages 37A include the first main passages 51, which extend linearly in the longitudinal direction Y and are arranged side by side in the orthogonal direction Z, and the first auxiliary passages 52b, which are adjacent to the first main passages 51 in the longitudinal direction Y and extend toward the outlet manifold 92. The second groove passages 47A include the second main passages 61, which extend linearly in the longitudinal direction Y and are arranged side by side in the orthogonal direction Z, and the second auxiliary passages 62a, which are located on the side of the MEA 10 opposite to the first auxiliary passages 52b. The first auxiliary passages 52b include the extending portions 53b, which extend in the orthogonal direction Z. The second auxiliary passages 62a include the extending portions 63a, which extend linearly in the orthogonal direction Z. One of the extending portions 53b of the first auxiliary passages 52b includes the wavy section 54b, which extends in a wavy shape in planar directions of the facing surface 30a. The wavy section 54b intersects with the extending portion 63a of the corresponding second auxiliary passage 62a with the MEA 10 in between.

The above-described configuration operates in the above-described manner.

With the above-described configuration, the first auxiliary passages 52b and the second auxiliary passages 62a respectively include the extending portions 53b, 63a, which extend in the orthogonal direction Z. Thus, the areas of the regions on the facing surfaces 30a, 40a of the separators 30, 40 in which the first auxiliary passages 52b and the second auxiliary passages 62a are formed are reduced as compared to, for example, a case in which the first auxiliary passages 52b and the second auxiliary passages 62a respectively extend obliquely with respect to the first main passages 51 and the second main passages 61. That is, it is possible to increase the areas of the regions on the facing surfaces 30a, 40a of the separators 30, 40 in which the first main passages 51 and the second main passages 61 are formed.

The power generation efficiency of the MEA 10 is improved, accordingly.

(2) The first groove passages 37A include the first auxiliary passages 52a, which are adjacent to the first main passages 51 in the longitudinal direction Y and extend toward the inlet manifold 91. The second groove passages 47A include the second auxiliary passages 62b, which are located on the side of the MEA 10 that is opposite to the first auxiliary passages 52a. The first auxiliary passages 52a include the extending portions 53a, which extend in the orthogonal direction Z. The second auxiliary passages 62b include the extending portions 63b, which extend linearly in the orthogonal direction Z. One of the extending portions 53a of the first auxiliary passages 52a includes the wavy section 54a, which extends in a wavy shape in planar directions of the facing surface 30a. The wavy section 54a intersects with the extending portion 63b of the corresponding second auxiliary passage 62b with the MEA 10 in between.

With this configuration, the first auxiliary passages 52a, which extend from the first main passages 51 toward the inlet manifold 91, and the second auxiliary passages 62b, which extend from the second main passage 61 toward the outlet manifold 96, achieve the same advantage as the item (1). This improves the power generation efficiency in a relatively large region in the MEA 10.

(3) Only the extending portions 53a (53b) of the first auxiliary passages 52a (52b) include the wavy section 54a (54b).

Water generated in the MEA 10 is discharged to the outlet manifold 96 via the second groove passages 47A. If the extending portions 63a (63b) of the second auxiliary passages 62a (62b) include a wavy section, the generated water is less likely to flow through the extending portions 63a (63b) as compared to a case in which the extending portions 63a (63b) extend linearly in the orthogonal direction Z.

In this regard, only the extending portions 53a (53b) of the first auxiliary passages 52a (52b) include the wavy section 54a (54b) in the above-described configuration. Thus, as compared to a case in which the extending portions 63a (63b) of the second auxiliary passages 62a (62b) include a wavy section, the generated water is efficiently discharged to the outlet manifold 96 via the second groove passages 47A. This configuration improves the power generation efficiency of the MEA 10, while efficiently discharging the generated water.

<Modifications>

The above-described embodiment may be modified as follows. The above-described embodiment and the following modifications can be combined if the combined modifications remain technically consistent with each other.

The shapes of the inlet manifolds 91, 93, 95 and the outlet manifolds 92, 94, 96 are not limited to rectangular shapes in plan view as in the above-described embodiment. For example, the shapes of the manifolds 91, 92, 93, 94, 95, 96 may be a quadrangular shape including a square in plan view, or may be a polygonal shape including a triangle and a pentagon in plan view. The shapes may be circular shapes in plan view such as an oval and a stadium shape.

The first main passages 51 are not limited to extending linearly in the longitudinal direction Y as in the above-described embodiment. For example, the first main passages 51 may include a wavy section that extends in a wavy shape in a planar direction of the facing surface 30a.

The second main passages 61 are not limited to extending linearly in the longitudinal direction Y as in the above-described embodiment. For example, the second main passages 61 may include a wavy section that extends in a wavy shape in a planar direction of the facing surface 40a.

The number of the first main passages 51 is not limited to that described in the above-described embodiment, but may be changed in accordance with the specification of the separator 30 when necessary. The numbers of the first auxiliary passages 52a, 52b are not limited to three as described in the above-described embodiment, but may be more than three. The number of the first main passages 51 that are respectively connected to the first auxiliary passages 52a, and the number of the first main passages 51 that are respectively connected to the first auxiliary passages 52b are not limited to five or six as described in the above-described embodiment, but may be changed in accordance with the changes described in the above-described modifications.

The number of the second main passages 61 is not limited to that described in the above-described embodiment, but may be changed in accordance with the specification of the separator 40 when necessary. The numbers of the second auxiliary passages 62a, 62b are not limited to three as described in the above-described embodiment, but may be more than three. The number of the second main passages 61 that are respectively connected to the second auxiliary passages 62a, and the number of the second main passages 61 that are respectively connected to the second auxiliary passages 62b are not limited to five or six as described in the above-described embodiment, but may be changed in accordance with the changes described in the above-described modifications.

In the above-described embodiment, the first auxiliary passages 52a are configured such that one of the extending portions 53a that is closest to the first side in the longitudinal direction Y (leftmost one in FIG. 2) includes the wavy section 54a. However, the present disclosure is not limited to this. Specifically, the first auxiliary passages 52a may include two or more wavy sections 54a. In this case, the wavy sections 54a may be located on a side of the MEA 10 that is opposite to the extending portions 63b, and may intersect with the extending portions 63b with the MEA 10 in between.

In the above-described embodiment, the first auxiliary passages 52b are configured such that one of the extending portions 53b that is closest to the second side in the longitudinal direction Y (rightmost one in FIG. 2) includes the wavy section 54b. However, the present disclosure is not limited to this. Specifically, the first auxiliary passages 52b may include two or more wavy sections 54b. In this case, the wavy sections 54b may be located on a side of the MEA 10 that is opposite to the extending portions 63a, and may intersect with the extending portions 63a with the MEA 10 in between.

If the first auxiliary passages 52a include the extending portions 53a, the first auxiliary passages 52a may include sections obliquely extending with respect to the first main passages 51. Likewise, if the first auxiliary passages 52b include the extending portions 53b, the first auxiliary passages 52b may include sections obliquely extending with respect to the first main passages 51.

If the second auxiliary passages 62a include the extending portions 63a, the first auxiliary passages 62a may include sections obliquely extending with respect to the second main passages 61. Likewise, if the second auxiliary passages 62b include the extending portions 63b, the second auxiliary passages 62b may include sections obliquely extending with respect to the second main passages 61.

Figure 5:
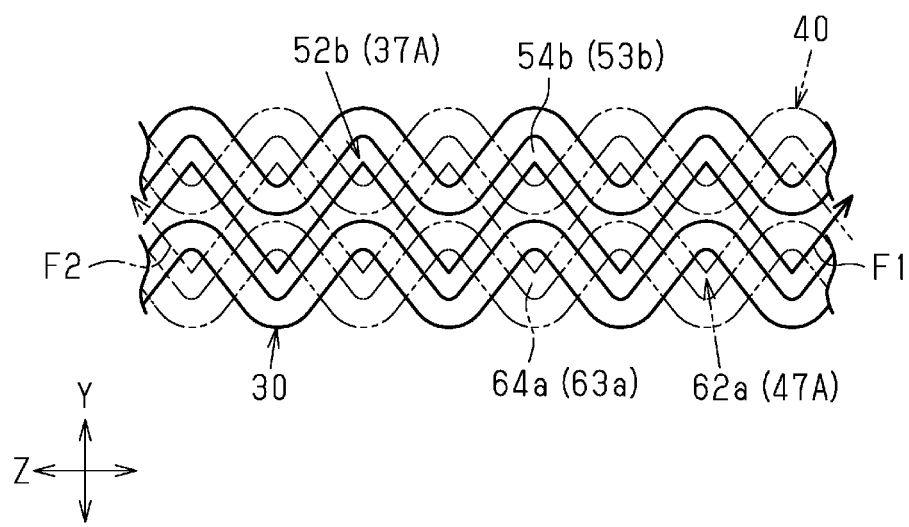
FIG. 5 is a plan view corresponding to FIG. 4, illustrating a state in which a flow of fuel gas and a flow of oxidant gas intersect with each other with a power generating unit in between in a fuel cell stack according to a modification.

The extending portions 63a are not limited to extending linearly in the orthogonal direction Z as in the above-described embodiment. For example, as shown in FIG. 5, the extending portions 63a may include a wavy section 64a that extends in a wavy shape in the orthogonal direction Z. Likewise, although not illustrated, the extending portions 63b may include a wavy section that extends in a wavy shape in the orthogonal direction Z.

The first auxiliary passages 52a (52b) may be omitted. In this case, the first groove passages 37A may be configured such that, in place of the first auxiliary passages 52a (52b), additional auxiliary passages that extend obliquely with respect to the first main passages 51 connect the first main passages 51 and the connecting passages 97 to each other. In accordance with this modification, the second auxiliary passages 62b (62a), which are located on a side of the MEA 10 opposite to the additional auxiliary passages may be omitted. In this case, the second groove passages 47A may be configured such that, in place of the second auxiliary passages 62b (62a), additional auxiliary passages that extend obliquely with respect to the second main passages 61 connect the second main passages 61 and the connecting passages 98 to each other.

The first separator 30 and the second separator 40 do not necessarily need to be formed by pressing metal plates, but may be formed by cutting or etching.

The material for the first separator 30 and the second separator 40 is not limited to titanium or stainless steel, but may be aluminum. Also, a material other than metal such as carbon may be used.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel cell stack, comprising stacked single cells, wherein
each single cell includes:
a power generating unit; and
a first separator and a second separator that hold the power generating unit between the first separator and the second separator,
each single cell includes manifolds on an outer side of the power generating unit,
the manifolds extend through the single cell in a stacking direction of the single cells and are configured such that a fuel gas or an oxidant gas flow through the manifolds,
the manifolds include:
a fuel gas inlet manifold configured to supply the fuel gas into the single cell;
a fuel gas outlet manifold configured to discharge the fuel gas from the single cell;
an oxidant gas inlet manifold configured to supply the oxidant gas into the single cell; and
an oxidant gas outlet manifold configured to discharge the oxidant gas from the single cell,
a first direction is orthogonal to the stacking direction,
a second direction is orthogonal to both the stacking direction and the first direction,
at a first end in the first direction of each single cell, the fuel gas inlet manifold and the oxidant gas outlet manifold are arranged in that order from a first side in the second direction,
at a second end in the first direction of each single cell, the oxidant gas inlet manifold and the fuel gas outlet manifold are arranged in that order from the first side in the second direction,
the first separator includes a facing surface that faces the power generating unit,
the facing surface of the first separator includes first groove passages through which the fuel gas flows,
the first groove passages include:
first main passages that extend in the first direction and are arranged side by side in the second direction; and
first auxiliary passages that are adjacent to the first main passages in the first direction and extend toward at least one of the fuel gas inlet manifold and the fuel gas outlet manifold,
the second separator includes a facing surface that faces the power generating unit,
the facing surface of the second separator includes second groove passages through which the oxidant gas flows,
the second groove passages include:
second main passages that extend in the first direction and are arranged side by side in the second direction; and
second auxiliary passages located on a side of the power generating unit that is opposite to the first auxiliary passages,
the first auxiliary passages and the second auxiliary passages each include an extending portion that extends in the second direction, the extending portions of at least one of a set of the first auxiliary passages or a set of the second auxiliary passages include a wavy section that extends in a wavy shape in planar directions of the facing surface, and the wavy section intersects with one of the extending portions of the other one of the set of the first auxiliary passages and the set of the second auxiliary passages with the power generating unit in between, wherein the extending portions of the first auxiliary passages and the extending portions of the second auxiliary passages are arranged opposite to one another, and only the extending portions of the first auxiliary passages include the wavy section.

2. The fuel cell stack according to claim 1, wherein the first auxiliary passages extend toward both the fuel gas inlet manifold and the fuel gas outlet manifold.

\* \* \* \* \*